US012699875B2

(12) United States Patent
Varghese

(10) Patent No.: US 12,699,875 B2
(45) Date of Patent: Aug. 4, 2026

(54) TECHNOLOGY SERVICE MANAGEMENT USING GRAPH NEURAL NETWORK

(71) Applicant: SAP SE, Walldorf (DE)

(72) Inventor: Sherwin Varghese, Kochi (IN)

(73) Assignee: SAP SE, Walldorf (DE)

( * ) Notice: Subject to any disclaimer, the term of this patent is extended or adjusted under 35 U.S.C. 154(b) by 872 days.

(21) Appl. No.: 18/076,881

(22) Filed: Dec. 7, 2022

(65) Prior Publication Data

US 2024/0193400 A1     Jun. 13, 2024

(51) Int. Cl.
G06N 20/00     (2019.01)
G06F 40/20     (2020.01)
G06N 3/042     (2023.01)

(52) U.S. Cl.
CPC ............. G06N 3/042 (2023.01); G06F 40/20 (2020.01)

(58) Field of Classification Search
CPC ................................. G06N 3/042; G06F 40/20
See application file for complete search history.

(56) References Cited

U.S. PATENT DOCUMENTS

| | | | | |
|---|---|---|---|---|
| 11,218,357 | B1 * | 1/2022 | Salinas | ............... H04L 43/0817 |
| 2019/0325323 | A1 * | 10/2019 | Walthers | ................ G06N 20/00 |
| 2020/0250022 | A1 * | 8/2020 | Li | ........................... H04L 67/10 |
| 2022/0035692 | A1 * | 2/2022 | Wang | ..................... G06Q 10/04 |

| | | | | |
|---|---|---|---|---|
| 2022/0108175 | A1 * | 4/2022 | Lyske | ...................... G06N 3/02 |
| 2022/0414524 | A1 * | 12/2022 | Nowak | ................... G06F 40/30 |
| 2023/0132465 | A1 * | 5/2023 | Kumar | ........... G06Q 10/063112 |
| | | | | 705/7.14 |
| 2023/0325748 | A1 * | 10/2023 | Duma | ................ G06F 11/0775 |
| | | | | 705/7.28 |
| 2023/0353525 | A1 * | 11/2023 | Timmons | .............. H04L 51/224 |
| 2025/0285749 | A1 * | 9/2025 | Naik | ................... G06F 11/0733 |

OTHER PUBLICATIONS

Liu, Chang, and Shiwu Yang. "Using text mining to establish knowledge graph from accident/incident reports in risk assessment." Expert Systems with Applications 207 (2022): 117991 (Year: 2022).*
Shetty, Manish, et al. "SoftNER: Mining knowledge graphs from cloud incidents." Empirical Software Engineering 27.4 (2022): 93 (Year: 2022).*

* cited by examiner

*Primary Examiner* — Andrew T Mcintosh
(74) *Attorney, Agent, or Firm* — SCHWEGMAN LUNDBERG & WOESSNER, P.A.

(57)     ABSTRACT

In some embodiments, a computer system may compute a knowledge graph using a graph neural network and source data corresponding to historical incidents, with the source data comprising knowledge base article data, historical incident data, component data, user data, and swarm data. The computer system may compute a new incident vector based on new incident data using a natural language understanding algorithm, and, for each one of a plurality of users, compute an updated user vector using the knowledge graph. The computer system may then compute a ranked list of the plurality of users based on a comparison of the new incident vector with the corresponding updated user vector of each one of the plurality of users.

20 Claims, 6 Drawing Sheets

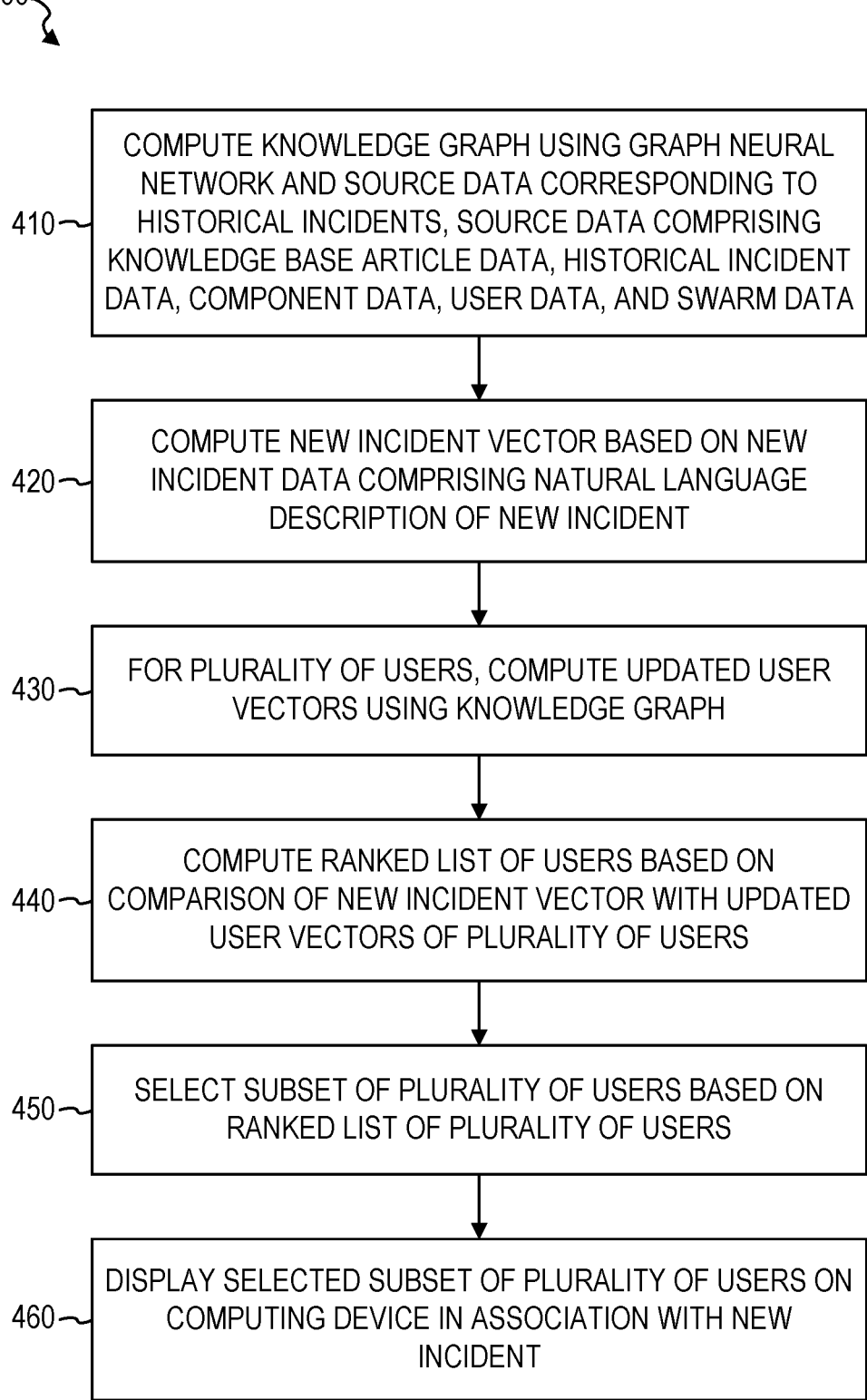

400

410 — COMPUTE KNOWLEDGE GRAPH USING GRAPH NEURAL NETWORK AND SOURCE DATA CORRESPONDING TO HISTORICAL INCIDENTS, SOURCE DATA COMPRISING KNOWLEDGE BASE ARTICLE DATA, HISTORICAL INCIDENT DATA, COMPONENT DATA, USER DATA, AND SWARM DATA

420 — COMPUTE NEW INCIDENT VECTOR BASED ON NEW INCIDENT DATA COMPRISING NATURAL LANGUAGE DESCRIPTION OF NEW INCIDENT

430 — FOR PLURALITY OF USERS, COMPUTE UPDATED USER VECTORS USING KNOWLEDGE GRAPH

440 — COMPUTE RANKED LIST OF USERS BASED ON COMPARISON OF NEW INCIDENT VECTOR WITH UPDATED USER VECTORS OF PLURALITY OF USERS

450 — SELECT SUBSET OF PLURALITY OF USERS BASED ON RANKED LIST OF PLURALITY OF USERS

460 — DISPLAY SELECTED SUBSET OF PLURALITY OF USERS ON COMPUTING DEVICE IN ASSOCIATION WITH NEW INCIDENT

*FIG. 4*

TECHNOLOGY SERVICE MANAGEMENT USING GRAPH NEURAL NETWORK

BACKGROUND

Information technology service management (ITSM) systems provide process and workflows that information technology (IT) teams use to provide their services in a company. ITSM systems may use software and tools to manage and track incidents involving IT components. ITSM systems may use ticketing software to allows organizations to resolve their internal IT issues by streamlining the resolution process. The elements they handle, called tickets, provide context about the issues, including details, categories, and any relevant tags. A ticket is a special document or record that represents an incident that requires action from the IT department. It often contains additional contextual details and may also include relevant contact information of the individual who created the ticket. A user having a technical problem or concern may send a ticket to their IT department for help in resolving the issue.

BRIEF DESCRIPTION OF THE DRAWINGS

Some example embodiments of the present disclosure are illustrated by way of example and not limitation in the figures of the accompanying drawings, in which like reference numbers indicate similar elements.

FIG. 4 is a flowchart illustrating an example method of using a graph neural network to rank a list of users for solving an information technology service incident.

DETAILED DESCRIPTION

Figure 1:
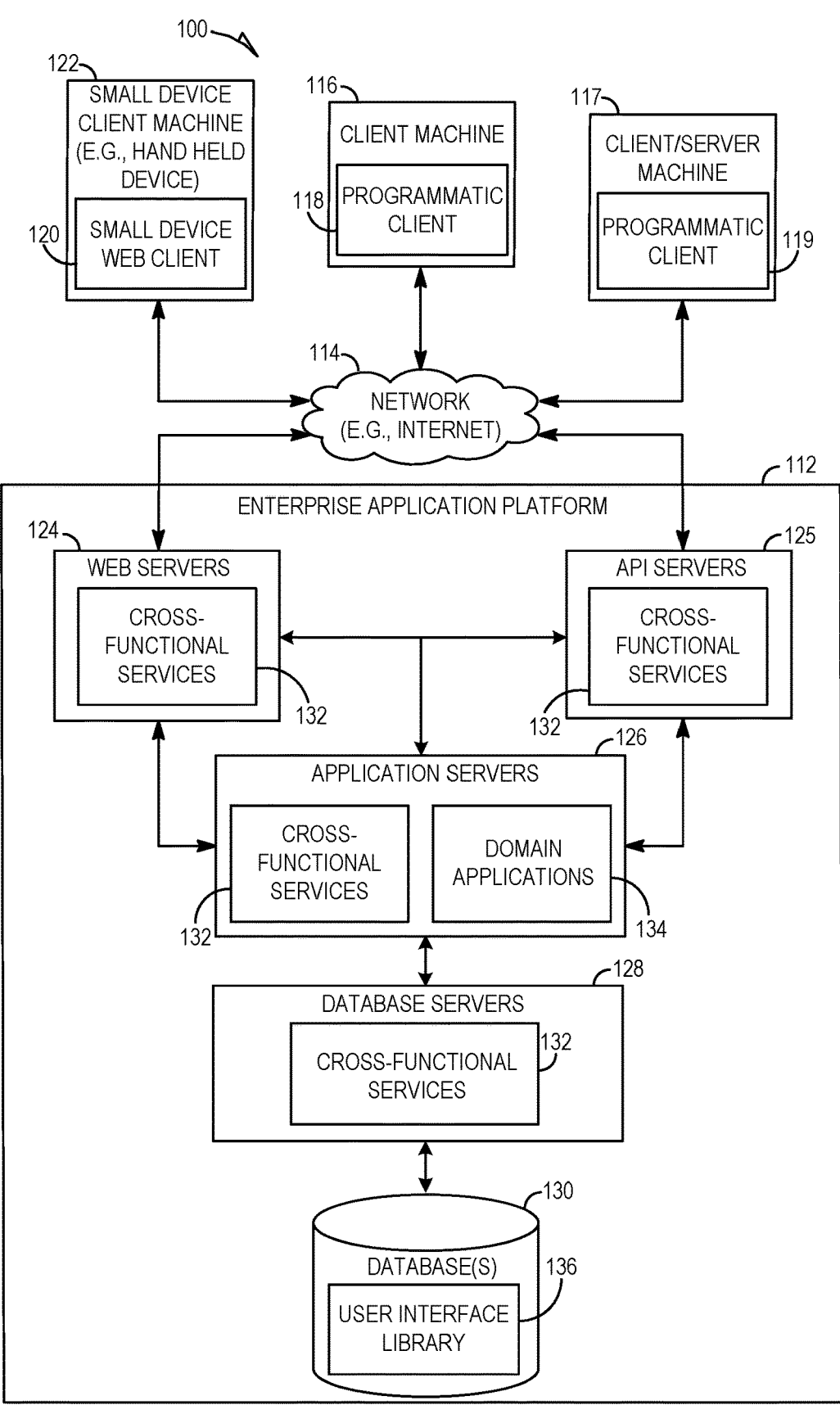
FIG. 1 is an example network diagram illustrating a system.

Example methods and systems of using a graph neural network to rank a list of users for solving an information technology service incident are disclosed. In the following description, for purposes of explanation, numerous specific details are set forth in order to provide a thorough understanding of example embodiments. It will be evident, however, to one skilled in the art that the present embodiments can be practiced without these specific details.

The amount of time taken to resolve a customer ticket is often quite high due to the complexity of the issue or due to delays in identifying engineering experts to assist in resolving the issue. The problem of identifying the ideal engineers for a given product support issue are typically considered solving using traditional machine learning approaches, such as term frequency-inverse document frequency (TF-IDF), random forest models, and other models. These approaches are relatively easy to train and have low model complexity. However, it is not possible to capture the relationships among the engineers who previously teamed up to solve a problem. For most of the support incidents, the first engineer who is assigned the problem is not the final processor solving the ticket. In such scenarios, traditional machine learning models lead to low accuracy. In addition to the issues discussed above, other technical problems may arise as well.

The implementation of the features disclosed herein involves a non-generic, unconventional, and non-routine operation or combination of operations. By applying one or more of the solutions disclosed herein, some technical effects of the system and method of the present disclosure are to develop a knowledge graph using a graph neural network, and then use the knowledge graph to rank a list of users for solving an information technology service incident. The system of the present disclosure may build a knowledge graph that represents the engineers, also referred to herein as users, that collectively solved customer incidents, the available product documentation, and the descriptions of the product components. The knowledge graph may then be used to produce a ranked list of users best fit to help resolve an incident.

In some example embodiments, a computer system may compute a knowledge graph using a graph neural network and source data corresponding to historical incidents for which corresponding tickets were created in an information technology service management (ITSM) system. The source data may comprise knowledge base article data comprising knowledge base articles used in solving the historical incidents, historical incident data comprising corresponding descriptions of the historical incidents, component data indicating components that were affected by the historical incidents, user data indicating a plurality of users who were involved in solving the historical incidents, and swarm data indicating swarms of users that were involved in solving the historical incidents. The computer system may compute a new incident vector based on new incident data of a new incident for which a new ticket was created in the ITSM system. The new incident data may comprise a natural language description of the new incident, with the new incident vector being computed using a first natural language understanding algorithm. For each one of the plurality of users, the computer system may compute a corresponding updated user vector using the knowledge graph. The computer system may then compute a ranked list of the plurality of users based on a comparison of the new incident vector with the corresponding updated user vector of each one of the plurality of users.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

FIG. 1 is an example network diagram illustrating a system 100. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The web servers 124, API servers 125, application servers 126, and database servers 128 can host cross-functional services 132. The cross-functional services 132 can include relational database modules to provide support services for access to the database(s) 130, which includes a user interface library 136. The application servers 126 can further host domain applications 134. The web servers 124 and the API servers 125 may be combined.

The cross-functional services 132 provide services to users and processes that utilize the enterprise application platform 112. For instance, the cross-functional services 132 can provide portal services (e.g., web services), database services, and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. In some example embodiments, the system 100 comprises a client-server system that employs a client-server architecture, as shown in FIG. 1. However, the embodiments of the present disclosure are, of course, not limited to a client-server architecture, and could equally well find application in a distributed, or peer-to-peer, architecture system.

Figure 2:
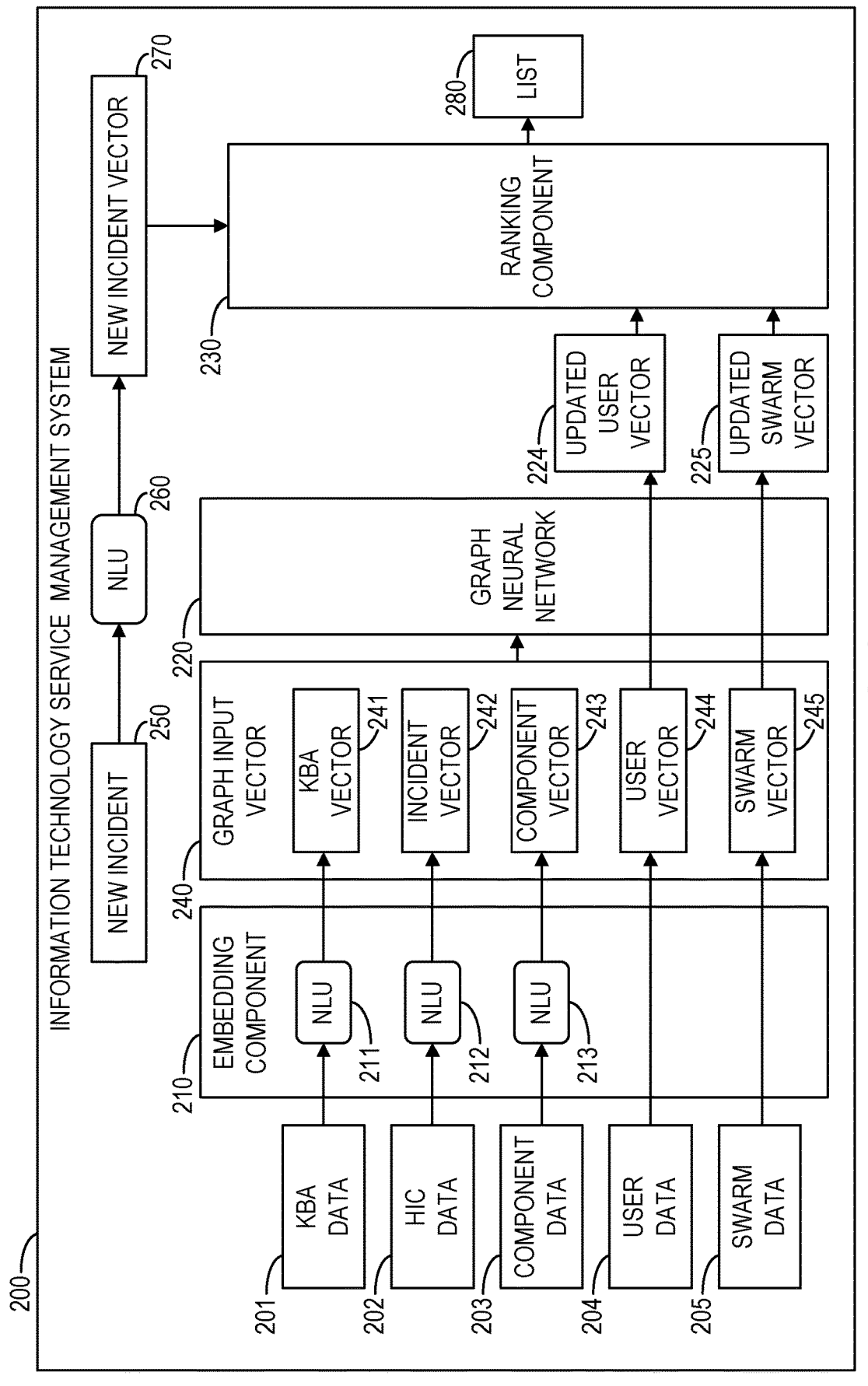
FIG. 2 is a block diagram illustrating an example information technology service management (ITSM) system.

FIG. 2 is a block diagram illustrating an example information technology service management (ITSM) system 200. Although the examples disclosed herein refer to the ITSM system 200, it is contemplated that the features of the present disclosure may be implemented with or incorporated into other types of online systems as well. The components shown in FIG. 2 may be configured to communicate with each other via one or more network connections. In some example embodiments, the ITSM system 200 comprises any combination of one or more of an embedding component 210, a graph neural network 220, and a ranking component 230. One or more of the components of the ITSM system 200 may be implemented by the enterprise application platform 112 of FIG. 1. For example, the embedding component 210, the graph neural network 220, and the ranking component 230 may be incorporated into the application server(s) 126. However, the ITSM system 200 may be implemented in other ways as well.

The ITSM 200 may use natural language understanding (NLU) and graph network theory. The ITSM system 200 may generate rich representations of text using transformer-based very large language models (VLLMs), such as a Bidirectional Encoder Representations from Transformer (BERT). These VLLMs take natural language as input and produce contextual embeddings that can be used for downstream tasks, such as sentence classification or named entity recognition.

The ITSM system 200 may use graph neural networks (GNNs) and neural structured learning (NSL) as feature generators for learning-to-rank algorithms. GNNs and NSL create dynamic embeddings for graph nodes that depend on learned weights, which are set by directly optimizing a loss function to perform best on a given task while taking the graph structure into account, via regularization of the loss function. Traditional measures of similarity, centrality, or link prediction, in contrast, are static and depend only on the graph structure. An analogous example is the relationship between a deep convolutional neural network and pre-deep learning methods of feature extraction on images. Allowing a deep neural network to perform the feature extraction automatically, based only on optimization of a loss function, is a much more powerful approach.

In some example embodiments, the ITSM system 200 may be configured to define a knowledge graph ontology that comprises incidents, components, knowledge base articles, users, and swarms. Incidents are the tickets or support requests that are raised by a customer or some other user for product support. The component refers to the tag that helps to identify the product or service for which the customer is facing an issue. Knowledge base articles are the help documentation, notes, and possible resolutions of previous customer issues. A user is an engineer that solved an incident in the past. A swarm is a group of engineers that collectively solved an incident in the past.

The ITSM system 200 may be configured to compute a knowledge graph using the graph neural network 220 and source data corresponding to historical incidents for which corresponding tickets were created in the ITSM system 200. The source data may comprise knowledge base article data 201 comprising knowledge base articles used in solving the historical incidents, historical incident data 202 comprising corresponding descriptions of the historical incidents, component data 203 indicating components that were affected by the historical incidents, user data 204 indicating a plurality of users who were involved in solving the historical incidents, and swarm data 205 indicating swarms of users that were involved in solving the historical incidents. The knowledge base article data 201 may further comprise authors of the knowledge base articles used in solving the historical incidents. Other types of knowledge base article data 201 are also within the scope of the present disclosure. The historical incident data 202 may comprise corresponding communications between the users who were involved in solving the historical incidents. Other types of historical incident data 202 are also within the scope of the present disclosure.

The ITSM system 200 may retrieve or otherwise obtain the knowledge base article data 201, the historical incident data 202, the component data 203, the user data 204, and the swarm data 205 from one or more data sources. The one or more data sources may comprise an internal ticket resolution system and a knowledge sharing system. However, other types of data sources are also within the scope of the present disclosure.

One data source may provide both incident-side and engineer-side data. On the incident side, it provides the original description of the incident, the steps to resolve the incident, as well as the product area and the relevant component as selected by the customer. On the engineer side, the data source may provide engineer responses to customers, which may be used both as input features for engineers and to inform which engineer resolved which incident. Examples of the data that may be obtained from this data source include, but are not limited to:

Incident identifications (IDs)—required primary key for an incident.

Communication summary—includes an anonymized version of all communications to/from customers and IDs of responding engineers.

Processor IDs (e.g., user IDs)—to understand which engineer processed the incident, and may also be used in joining to other data sources.

Components—to understand which components are affected by the incident.

Incident creation date, incident confirmed date—will give temporal context to the evaluation during a specific time frame. This may also help in data composition.

Another data source may provide information regarding each engineer's component expertise. This information may indicate for what components an engineer is an expert. For example, this information may comprise a user's corporate ID and a list of components with expertise ratings for the user's corporate ID.

Yet another data source may comprise product support knowledge base articles. Certain incidents warrant the creation of a KBA within the database that clearly documents the problem and its resolution so that similar problems can be solved quickly and easily in the future. The authors of such KBAs can be seen as experts who are well fit to resolve such types of problems. Hence, the inclusion of KBA and authorship data provides us a rich set of contextual information on the expertise of engineers that goes well beyond their stated component expertise evaluations. For KBA data, the following fields may be considered:

The full text of the article (including "See Also" and "Keywords"). Images and other media within the articles are out of scope as it would make the models complex.

Responsible user IDs.

Processor user IDs.

Category.

Component.

KBA creation date.

KBA ID.

Yet another data source may comprise swarming data. This data consists of swarms that have been requested and responded to in the past. This data provides training and evaluation data for the swarming scenario. In particular, the responding swarmer provides a prediction target. This data may include:

Incident ID to connect the swarm to an incident.

User ID of the swarm requestor.

User ID of the swarm responder.

Swarm ID in case multiple swarms are initiated for a single incident.

KBA IDs created for the swarm.

Swarm creation date.

Component.

Swarm component.

In some example embodiments, the ITSM system 200 may be configured to aggregate these data and construct the graph neural network 220, incorporating and joining all the data so that graph-based approaches can be leveraged. The ITSM system 200 may use deep learning models to ingest two basic types of data: graph/network structured data and unstructured natural language data. Specifically, the ITSM system 200 may leverage neural methods, graph neural networks (GNNs) for the former and transformers, recurrent neural networks (RNNs) for the latter, which are powerful parametric models that can be trained to directly optimize for the recommendation task.

Users, KBAs, and incidents may be treated as vertices on a graph which connect, via edges, to other vertices as appropriate. For example, a user (e.g., an engineer) may be connected to incidents they have solved, KBAs they have authored, and other users who they have swarmed with.

NLU components, including algorithms and neural networks, may be used to ingest the natural language features of incidents and KBAs, and to create input embeddings (e.g., a set of numbers that encode the relevant information) for the graph neural network 220. A simple one-hot embedding (a 1 indicates a relevant component is present and 0 is used for all other components) may be used to encode component information. The graph neural network 220 may then takes all relevant input embeddings and the underlying graph structure to produce a final set of embeddings for each user in the graph. The ITSM system 200 may perform an initial phase that involves data cleaning for the KBA data 201, the historical incident data 202 (e.g., historical incident communication), and the component data 203 (e.g., component description). The necessary data sets may be extracted from their corresponding databases and joined together.

In some example embodiments, the embedding component 210 may be configured to compute a corresponding knowledge base article vector 241 for each one of the knowledge base articles, compute a corresponding historical incident vector 242 for each one of the historical incidents, and compute a corresponding component vector 243 for each one of the components using corresponding natural language understanding algorithms 211, 212, and 213, respectively. The computing of the knowledge graph may comprise inputting the computed knowledge base article vectors 241, historical incident vectors 242, and component vectors 243 along with the user vectors 244 and the swarm vectors 245 as part of a graph input vector 240 into the graph neural network 220.

Figure 3:
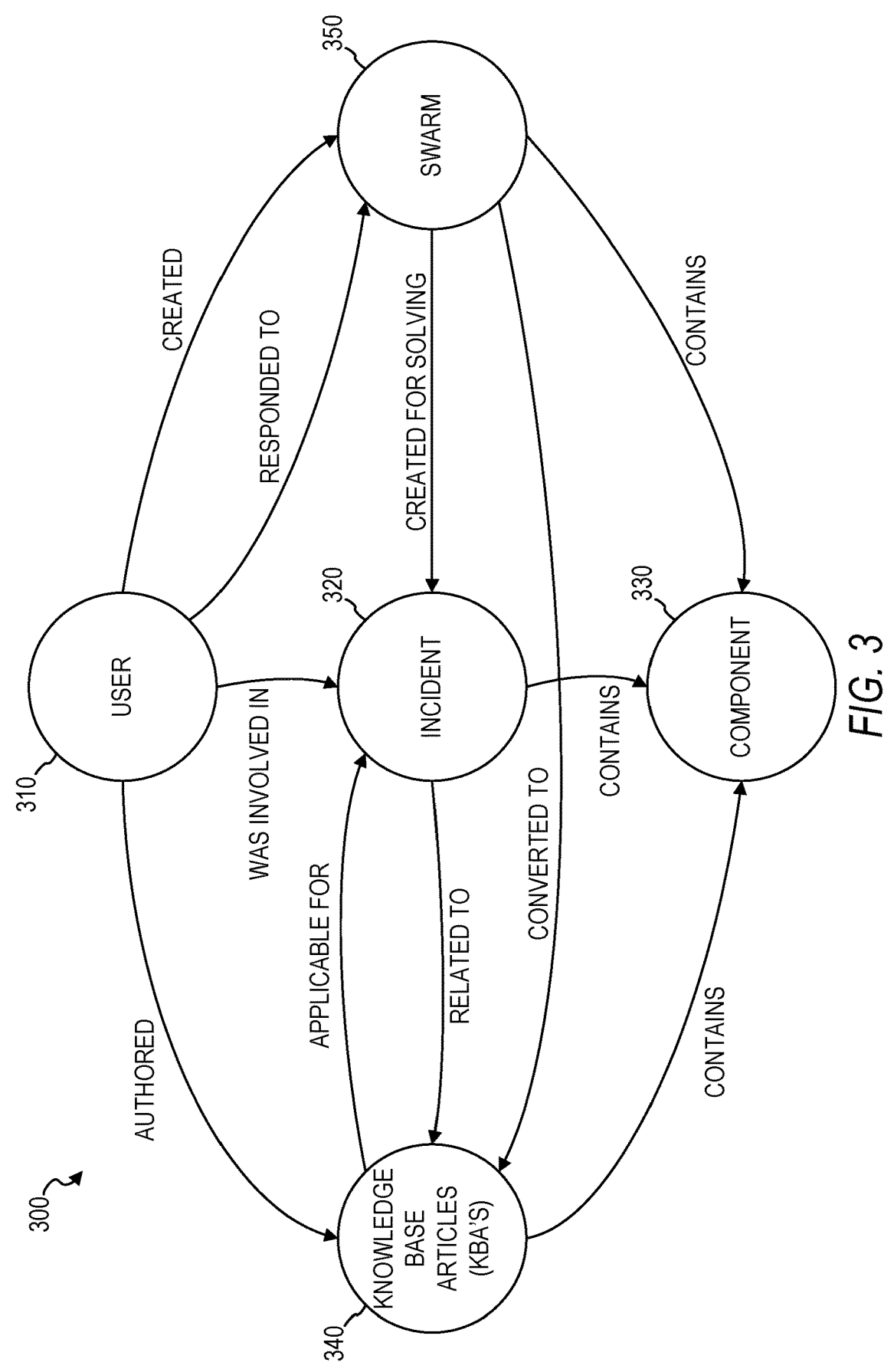
FIG. 3 illustrates an example knowledge graph ontology.

The graph neural network 220 may be configured to generate the knowledge graph using the graph input vectors 240 based on a knowledge graph ontology. FIG. 3 illustrates an example knowledge graph ontology 300. The knowledge graph ontology 300 comprises nodes or vertices that represent users 310, incidents 320, components 330, knowledge base articles 340, and swarms 350. The nodes may be connected by edges based on relationships between them. For example, each user 310 may be connected to the incidents 320 that the user 310 was involved in, to the knowledge base articles 340 that the user 310 authored, and to the swarms 350 that the user 310 created or responded to. Each knowledge base article 340 may be connected to the users 310 who authored it, to the incidents 320 to which it is related, to the components 330 that it contains, and to the swarms that were involved in its creation (e.g., when an incident is resolved by a swarm, the notes for the incident may be converted into a knowledge base article).

Referring back to FIG. 2, The ITSM system 200 may compute a new incident vector 270 based on new incident data of a new incident 250 for which a new ticket was created in the ITSM system 200. The new incident data may comprise a natural language description of the new incident 250, and the new incident vector 270 may be computed using a corresponding natural language understanding algorithm 260. The ITSM system 200 may be configured to, for each one of the plurality of users, compute a corresponding updated user vector 224 using the knowledge graph of the graph neural network 220. Additionally, the ITSM system 200 may, for each one of the swarms of users, compute a corresponding updated swarm vector 225 using the knowledge graph of the graph neural network 220.

In some example embodiments, the ranking component 230 may be configured to compute a ranked list 280 of the plurality of users based on a comparison of the new incident vector 270 with the corresponding updated user vector 224 of each one of the plurality of users. The computing of the ranked list 280 of the plurality of users may be further based on a comparison of the new incident vector 270 with the corresponding updated swarm vector 225 of each one of the swarms of users. The ranking component 230 may, for each one of the plurality of users, compute a corresponding difference between the new incident vector 270 and the corresponding updated user vector 224 using a triplet loss function. Triplet loss is a loss function for machine learning algorithms where a reference input, referred to as the anchor, is compared to a matching input, referred to as the positive, and a non-matching input, referred to as the negative. The distance from the anchor to the positive is minimized, and the distance from the anchor to the negative input is maximized. The ranking component 230 may then rank the plurality of users based on the corresponding differences between the new incident vector 270 and the corresponding updated user vectors 224 for the plurality of users.

The ranking component 230 may select a subset of the plurality of users based on the ranked list 280 of the plurality of users. For example, the ITSM system 200 may select the top ten ranked users in the ranked list 280 of the plurality of users. Other configurations for selecting the subset are also within the scope of the present disclosure. The ITSM system 200 may then cause the selected subset of the plurality of users to be displayed on a computing device in association with the new incident. For example, the selected subset of the plurality of users may be displayed on the computing device of a user that created the ticket for the new incident 250. Additionally or alternatively, the selected subset of the plurality of users may be added to the ticket corresponding to the new incident 250, thereby enabling any user that accesses the ticket to view the selected subset of the plurality of users.

In some example embodiments, the ITSM system 200 may use one or more graphical processing units (GPU's) to perform the data cleaning, as well as the generating of the knowledge graph and embeddings. The graph neural network 220 may use GPU's that run on a centrally-managed web-based interactive computational environment. This use of the GPU's may significantly reduce the processing times and enable parallel processing using multiple GPU cores.

FIG. 4 is a flowchart illustrating an example method 400 of using a graph neural network to rank a list of users for solving an information technology service incident. The method 400 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 400 are performed by the ITSM system 200 of FIG. 2 or any combination of one or more of its components.

At operation 410, the ITSM system 200 may compute a knowledge graph using a graph neural network 220 and source data corresponding to historical incidents for which corresponding tickets were created in the ITSM system 200. The source data may comprise knowledge base article data 201 comprising knowledge base articles used in solving the historical incidents, historical incident data 202 comprising corresponding descriptions of the historical incidents, component data 203 indicating components that were affected by the historical incidents, user data 204 indicating a plurality of users who were involved in solving the historical incidents, and swarm data 205 indicating swarms of users that were involved in solving the historical incidents. The knowledge base article data 201 may further comprise authors of the knowledge base articles used in solving the historical incidents. Other types of knowledge base article data 201 are also within the scope of the present disclosure. The historical incident data 202 may comprise corresponding communications between the users who were involved in solving the historical incidents. Other types of historical incident data 202 are also within the scope of the present disclosure.

In some example embodiments, the ITSM system 200 may compute a corresponding knowledge base article vector 241 for each one of the knowledge base articles, compute a corresponding historical incident vector 242 for each one of the historical incidents, and compute a corresponding component vector 243 for each one of the components using corresponding natural language understanding algorithms 211, 212, and 213, respectively. The computing of the knowledge graph may comprise inputting the computed knowledge base article vectors 241, historical incident vectors 242, and component vectors 243 into the graph neural network 220.

Next, the ITSM system 200 may, at operation 420, compute a new incident vector 270 based on new incident data of a new incident 250 for which a new ticket was created in the ITSM system 200. The new incident data may comprise a natural language description of the new incident 250, and the new incident vector 270 may be computed using a corresponding natural language understanding algorithm 260.

The ITSM system 200 may, for each one of the plurality of users, compute a corresponding updated user vector 224 using the knowledge graph, at operation 430. Additionally, the ITSM system 200 may, for each one of the swarms of users, compute a corresponding updated swarm vector 225 using the knowledge graph.

At operation 440, the ITSM system 200 may then compute a ranked list 280 of the plurality of users based on a comparison of the new incident vector 270 with the corresponding updated user vector 224 of each one of the plurality of users. The computing of the ranked list 280 of the plurality of users may be further based on a comparison of the new incident vector 270 with the corresponding updated swarm vector 225 of each one of the swarms of users.

Next, the ITSM system 200 may, at operation 450, select a subset of the plurality of users based on the ranked list 280 of the plurality of users. For example, the ITSM system 200 may select the top ten ranked users in the ranked list 280 of the plurality of users. Other configurations for selecting the subset are also within the scope of the present disclosure.

The ITSM system 200 may then cause the selected subset of the plurality of users to be displayed on a computing device in association with the new incident, at operation 460. For example, the selected subset of the plurality of users may be displayed on the computing device of a user that created the ticket for the new incident 250. Additionally or alternatively, the selected subset of the plurality of users may be added to the ticket corresponding to the new incident 250, thereby enabling any user that accesses the ticket to view the selected subset of the plurality of users.

It is contemplated that any of the other features described within the present disclosure can be incorporated into the method 400.

Figure 5:
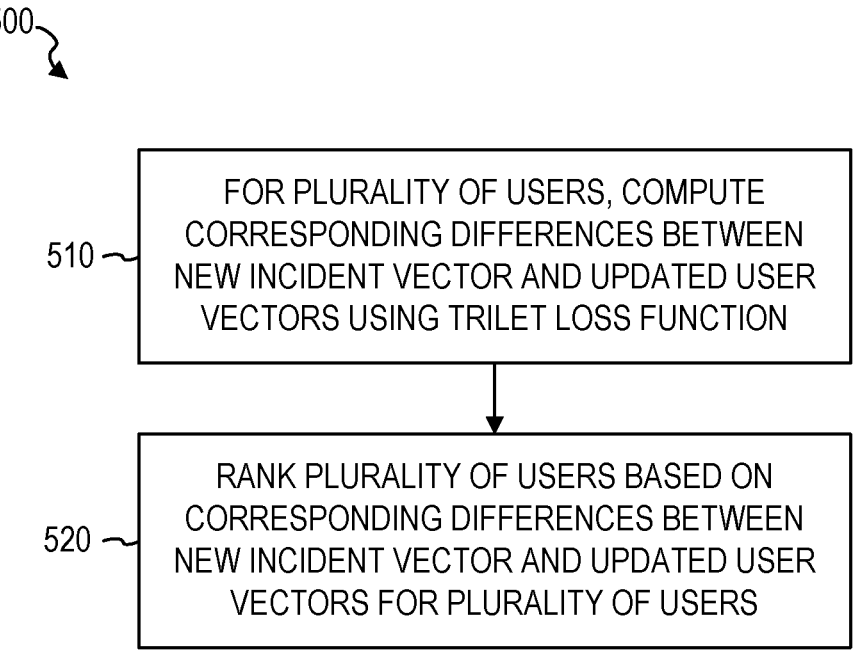
FIG. 5 is a flowchart illustrating an example method of computing a ranked list of users.

FIG. 5 is a flowchart illustrating an example method 500 of computing a ranked list of users. The method 500 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 500 are performed by the ITSM system 200 of FIG. 2 or any combination of one or more of its components. The method 500 may comprise operation 510 and 520, which may be incorporated into operation 440 of the method 400 in FIG. 4.

At operation 510, the ITSM system 200 may, for each one of the plurality of users, compute a corresponding difference between the new incident vector 270 and the corresponding updated user vector 224 using a triplet loss function. Triplet loss is a loss function for machine learning algorithms where a reference input, referred to as the anchor, is compared to a matching input, referred to as the positive, and a non-matching input, referred to as the negative. The distance from the anchor to the positive is minimized, and the distance from the anchor to the negative input is maximized. The ITSM system 200 may then rank the plurality of users based on the corresponding differences between the new incident vector 270 and the corresponding updated user vectors 224 for the plurality of users.

It is contemplated that any of the other features described within the present disclosure can be incorporated into the method 500.

In view of the disclosure above, various examples are set forth below. It should be noted that one or more features of an example, taken in isolation or combination, should be considered within the disclosure of this application.

Example 1 includes a computer-implemented method performed by a computer system having a memory and at least one hardware processor, the computer-implemented method comprising: computing a knowledge graph using a graph neural network and source data corresponding to historical incidents for which corresponding tickets were created in an online system, the source data comprising knowledge base article data comprising knowledge base articles used in solving the historical incidents, historical incident data comprising corresponding descriptions of the historical incidents, component data indicating components that were affected by the historical incidents, user data indicating a plurality of users who were involved in solving the historical incidents, and swarm data indicating swarms of users that were involved in solving the historical incidents; computing a new incident vector based on new incident data of a new incident for which a new ticket was created in the online system, the new incident data comprising a natural language description of the new incident, the new incident vector being computed using a first natural language understanding algorithm; for each one of the plurality of users, computing a corresponding updated user vector using the knowledge graph; and computing a ranked list of the plurality of users based on a comparison of the new incident vector with the corresponding updated user vector of each one of the plurality of users.

Example 2 includes the computer-implemented method of example 1, further comprising: for each one of the swarms of users, computing a corresponding updated swarm vector using the knowledge graph, wherein the computing the ranked list of the plurality of users is further based on a comparison of the new incident vector with the corresponding updated swarm vector of each one of the swarms of users.

Example 3 includes the computer-implemented method of example 1 or example 2, wherein the computing the ranked list of the plurality of users based on the comparison of the new incident vector with the corresponding user vector of each one of the plurality of users comprises: for each one of the plurality of users, computing a corresponding difference between the new incident vector and the corresponding updated user vector using a triplet loss function; and ranking the plurality of users based on the corresponding differences between the new incident vector and the corresponding updated user vectors for the plurality of users.

Example 4 includes the computer-implemented method of any one of examples 1 to 3, further comprising: selecting a subset of the plurality of users based on the ranked list of the plurality of users; and causing the selected subset of the plurality of users to be displayed on a computing device in association with the new incident.

Example 5 includes the computer-implemented method of any one of examples 1 to 4, wherein the historical incident data comprises corresponding communications between the users who were involved in solving the historical incidents.

Example 6 includes the computer-implemented method of any one of examples 1 to 5, wherein the knowledge base article data further comprises authors of the knowledge base articles used in solving the historical incidents.

Example 7 includes the computer-implemented method of any one of examples 1 to 6, further comprising: computing a corresponding knowledge base article vector for each one of the knowledge base articles using a second natural language understanding algorithm; computing a corresponding historical incident vector for each one of the historical incidents using a third natural language understanding algorithm; and computing a corresponding component vector for each one of the components using a fourth natural language understanding algorithm; wherein the computing the knowledge graph comprises inputting the computed knowledge base article vectors, historical incident vectors, and component vectors into the graph neural network.

Example 8 includes a system comprising: at least one processor; and a non-transitory computer-readable medium storing executable instructions that, when executed, cause the at least one processor to perform the method of any one of examples 1 to 7.

Example 9 includes a non-transitory machine-readable storage medium, tangibly embodying a set of instructions that, when executed by at least one processor, causes the at least one processor to perform the method of any one of examples 1 to 7.

Example 10 includes a machine-readable medium carrying a set of instructions that, when executed by at least one processor, causes the at least one processor to carry out the method of any one of examples 1 to 7.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them.

Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

Figure 6:
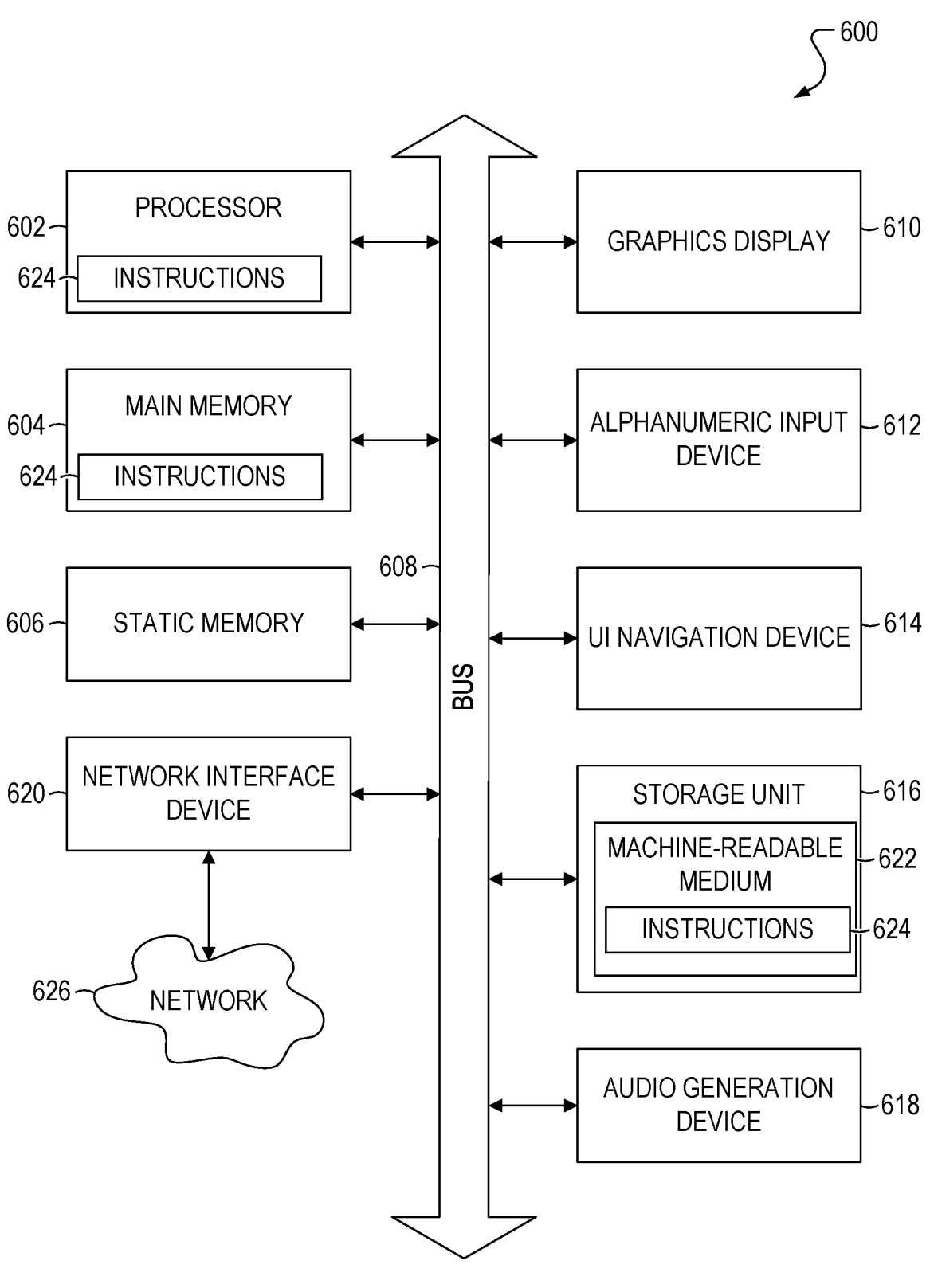
FIG. 6 is a block diagram of an example computer system on which methodologies described herein can be executed.

FIG. 6 is a block diagram of a machine in the example form of a computer system 600 within which instructions 624 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604, and a static memory 606, which communicate with each other via a bus 608. The computer system 600 may further include a graphics or video display unit 610 (e.g., a liquid crystal display (LCD) or a cathode ray tube (CRT)). The computer system 600 also includes an alphanumeric input device 612 (e.g., a keyboard), a user interface (UI) navigation (or cursor control) device 614 (e.g., a mouse), a storage unit (e.g., a disk drive unit) 616, an audio or signal generation device 618 (e.g., a speaker), and a network interface device 620.

The storage unit 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media. The instructions 624 may also reside, completely or at least partially, within the static memory 606.

While the machine-readable medium 622 is shown in an example embodiment to be a single medium, the term "machine-readable medium" may include a single medium or multiple media (e.g., a centralized or distributed database, and/or associated caches and servers) that store the one or more instructions 624 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Unless specifically stated otherwise, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method performed by a computer system comprising a memory and at least one hardware processor, the computer-implemented method comprising:

computing a corresponding knowledge base article vector for each of one or more knowledge base articles used in solving historical incidents for which corresponding tickets were created in an online system, using a first natural language understanding algorithm;

computing a corresponding historical incident vector for each of one or more historical incidents described in historical incident data, using a second natural language understanding algorithm; and computing a corresponding component vector for each of one or more components that were affected by the historical incidents, using a third natural language understanding algorithm;

computing a knowledge graph using a graph neural network by inputting the computed knowledge base article vectors, historical incident vectors, component vectors, user data indicating a plurality of users who were involved in solving the historical incidents, and swarm data indicating swarms of users that were involved in solving the historical incidents, into the graph neural network;

computing a new incident vector based on new incident data of a new incident for which a new ticket was created in the online system, the new incident data comprising a natural language description of the new incident, the new incident vector being computed using a fourth natural language understanding algorithm;

for each one of the plurality of users, computing a corresponding updated user vector using the knowledge graph; and computing a ranked list of the plurality of users based on a comparison of the new incident vector with the corresponding updated user vector of each one of the plurality of users.

2. The computer-implemented method of claim 1, further comprising:

for each one of the swarms of users, computing a corresponding updated swarm vector using the knowledge graph, wherein the computing the ranked list of the plurality of users is further based on a comparison of the new incident vector with the corresponding updated swarm vector of each one of the swarms of users.

3. The computer-implemented method of claim 1, wherein the computing the ranked list of the plurality of users based on the comparison of the new incident vector with the corresponding user vector of each one of the plurality of users comprises:

for each one of the plurality of users, computing a corresponding difference between the new incident vector and the corresponding updated user vector using a triplet loss function; and ranking the plurality of users based on the corresponding differences between the new incident vector and the corresponding updated user vectors for the plurality of users.

4. The computer-implemented method of claim 1, further comprising:

selecting a subset of the plurality of users based on the ranked list of the plurality of users; and causing the selected subset of the plurality of users to be displayed on a computing device in association with the new incident.

5. The computer-implemented method of claim 1, wherein the historical incident data comprises corresponding communications between the users who were involved in solving the historical incidents.

6. The computer-implemented method of claim 1, wherein the knowledge base article data further comprises authors of the knowledge base articles used in solving the historical incidents.

7. The computer-implemented method of claim 1, wherein the fourth natural language understanding algorithm comprises a transformer-based language model that produces contextual embeddings of the natural language description.

8. A system comprising:

at least one hardware processor; and a non-transitory computer-readable medium storing executable instructions that, when executed, cause the system to perform computer operations comprising:

computing a corresponding knowledge base article vector for each of one or more knowledge base articles used in solving historical incidents for which corresponding tickets were created in an online system, using a first natural language understanding algorithm;

computing a corresponding historical incident vector for each of one or more historical incidents described in historical incident data, using a second natural language understanding algorithm; and computing a corresponding component vector for each of one or more components that were affected by the historical incidents, using a third natural language understanding algorithm;

computing a knowledge graph using a graph neural network by inputting the computed knowledge base article vectors, historical incident vectors, component vectors, user data indicating a plurality of users who were involved in solving the historical incidents, and swarm data indicating swarms of users that were involved in solving the historical incidents, into the graph neural network;

computing a new incident vector based on new incident data of a new incident for which a new ticket was created in the online system, the new incident data comprising a natural language description of the new incident, the new incident vector being computed using a fourth natural language understanding algorithm;

for each one of the plurality of users, computing a corresponding updated user vector using the knowledge graph; and computing a ranked list of the plurality of users based on a comparison of the new incident vector with the corresponding updated user vector of each one of the plurality of users.

9. The system of claim 8, wherein the computer operations further comprise:

for each one of the swarms of users, computing a corresponding updated swarm vector using the knowledge graph, wherein the computing the ranked list of the plurality of users is further based on a comparison of the new incident vector with the corresponding updated swarm vector of each one of the swarms of users.

10. The system of claim 8, wherein the computing the ranked list of the plurality of users based on the comparison of the new incident vector with the corresponding user vector of each one of the plurality of users comprises:

for each one of the plurality of users, computing a corresponding difference between the new incident vector and the corresponding updated user vector using a triplet loss function; and ranking the plurality of users based on the corresponding differences between the new incident vector and the corresponding updated user vectors for the plurality of users.

11. The system of claim 8, wherein the computer operations further comprise:

selecting a subset of the plurality of users based on the ranked list of the plurality of users; and causing the selected subset of the plurality of users to be displayed on a computing device in association with the new incident.

12. The system of claim 8, wherein the historical incident data comprises corresponding communications between users who were involved in solving the historical incidents.

13. The system of claim 8, wherein the knowledge base article data further comprises authors of the knowledge base articles used in solving the historical incidents.

14. The system of claim 8, wherein the fourth natural language understanding algorithm comprises a transformer-based language model that produces contextual embeddings of the natural language description.

15. A non-transitory machine-readable storage medium tangibly embodying a set of instructions that, when executed by at least one hardware processor, causes the at least one processor to perform computer operations comprising:

computing a corresponding knowledge base article vector for each of one or more knowledge base articles used in solving historical incidents for which corresponding tickets were created in an online system, using a first natural language understanding algorithm;

computing a corresponding historical incident vector for each of one or more historical incidents described in historical incident data, using a second natural language understanding algorithm; and computing a corresponding component vector for each of one or more components that were affected by the historical incidents, using a third natural language understanding algorithm;

computing a knowledge graph using a graph neural network by inputting the computed knowledge base article vectors, historical incident vectors, component vectors, user data indicating a plurality of users who were involved in solving the historical incidents, and swarm data indicating swarms of users that were involved in solving the historical incidents, into the graph neural network;

computing a new incident vector based on new incident data of a new incident for which a new ticket was created in the online system, the new incident data comprising a natural language description of the new incident, the new incident vector being computed using a fourth natural language understanding algorithm;

for each one of the plurality of users, computing a corresponding updated user vector using the knowledge graph; and computing a ranked list of the plurality of users based on a comparison of the new incident vector with the corresponding updated user vector of each one of the plurality of users.

16. The non-transitory machine-readable storage medium of claim 15, wherein the computer operations further comprise:

for each one of the swarms of users, computing a corresponding updated swarm vector using the knowledge graph, wherein the computing the ranked list of the plurality of users is further based on a comparison of the new incident vector with the corresponding updated swarm vector of each one of the swarms of users.

17. The non-transitory machine-readable storage medium of claim 15, wherein the computing the ranked list of the plurality of users based on the comparison of the new incident vector with the corresponding user vector of each one of the plurality of users comprises:

for each one of the plurality of users, computing a corresponding difference between the new incident vector and the corresponding updated user vector using a triplet loss function; and ranking the plurality of users based on the corresponding differences between the new incident vector and the corresponding updated user vectors for the plurality of users.

18. The non-transitory machine-readable storage medium of claim 15, wherein the computer operations further comprise:

selecting a subset of the plurality of users based on the ranked list of the plurality of users; and causing the selected subset of the plurality of users to be displayed on a computing device in association with the new incident.

19. The non-transitory machine-readable storage medium of claim 15, wherein the historical incident data comprises corresponding communications between the users who were involved in solving the historical incidents.

20. The non-transitory machine-readable storage medium of claim 15, wherein the knowledge base article data further comprises authors of the knowledge base articles used in solving the historical incidents.

\* \* \* \* \*